United States Patent Office 3,200,465
Patented Aug. 17, 1965

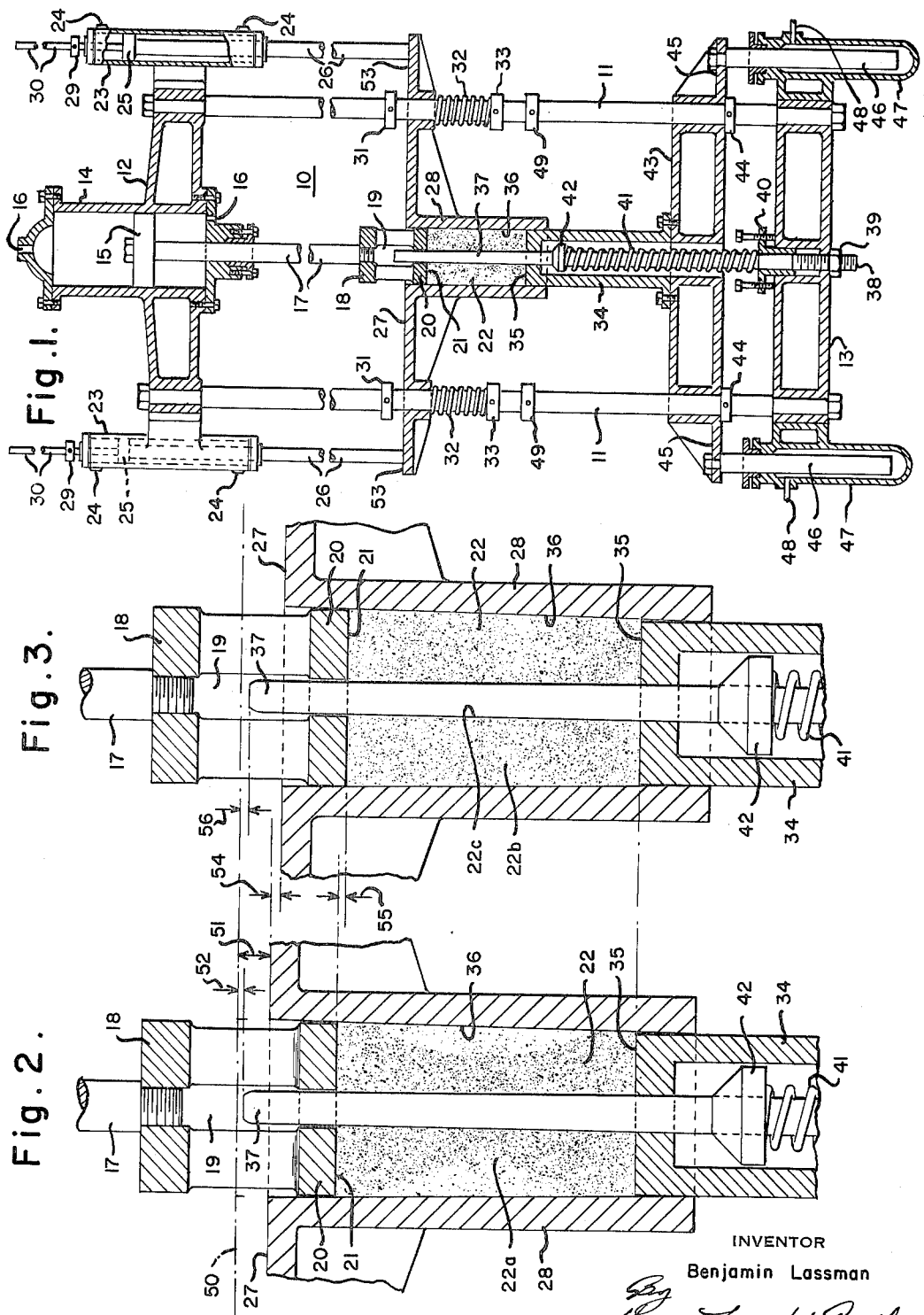

3,200,465
SOLIDS PRESS MOLDING APPARATUS
Benjamin Lassman, Pittsburgh, Pa., assignor to Benjamin Lassman & Son, Glenshaw, Pa., a partnership of Pennsylvania
Filed Jan. 28, 1963, Ser. No. 254,255
6 Claims. (Cl. 25—27)

This invention relates to apparatus for molding relatively dry solids capable of adherent compaction into a molded shape, commonly called dry pressing. More particularly, this invention relates to improvements upon the invention disclosed in my prior Patent No. 2,209,404. The present invention comprises combinative means and steps of action whereby relatively uniform density is obtainable throughout the final molded shape, and, side wall friction and wear are reduced and effects thereof inhibited in the course of a molding operation hereunder.

In the manufacture of refractory molded shapes and bricks used in liners for ladles and runners for molten metal such as steel, or as insulation for steel rod stems of ladle stoppers, it has been observed that such shapes and bricks made by prior molding practices have lacked uniform density, even when made using mold boxes having a slight upward flare for release advantage, which caused uneven wear and erosion in the course of use, usually by premature loss of portions thereof of lesser density.

In practices of this invention, marked improvement in the uniformity of density of molded refractory and ceramic shapes is achievable and mold box side wall wear and wear on any mandrel core which may be utilized are inhibited with consequent improvement in the quality of the molded shape, whether solid or hollow, and longer periods of trouble-free operation with resulting reduction in equipment and labor costs.

Other objects, features and advantages of this invention will be apparent from the following description and from the accompanying drawings, which are illustrative of one embodiment only, in which FIGURE 1 is a front view, partly in vertical section, of one embodiment of a press suitable for an operation of this invention, shown in position at an intermediate stage of a dry pressing operation thereon, said embodiment incorporating novel structural features;

FIGURE 2 is an enlarged view of the mold box area of the embodiment shown in FIGURE 1 in the same relative stage of pressing of a molded shape; and FIGURE 3 is a further view of the mold box area in which the embodiment has been further pressed to accomplish objects of this invention including a more uniform densification throughout the molded shape.

Referring to the drawings, there is shown a molding machine 10 incorporating one embodiment of the apparatus combination of this invention. Therein, there are a plurality of vertical parallel rod standards 11, which may be two, four, or six, in number as required for the particular service, disposed in angular uniformity about the vertical axis of machine 10. As shown, there are two parallel rods 11 joined together at the top by a yoke 12 and at the bottom by a yoke 13 to complete the basic frame of the machine.

Yoke 12 supports a central and vertical main pressing cylinder 14 having a double-acting piston 15 thereof preferably operated hydraulically through ports 16. A piston rod 17 extends through the lower end of cylinder 14 for rigid connection to a press head 18. Head 18 as shown is annular having a vertical central opening 19 extending upwardly thereinto through a lower end 20 having a bottom surface 21 adapted to engage solids 22 such as granular material which becomes adherent in the form of a molded shape upon being subjected to appropriate pressure. A term such as "annular" as used herein includes outlines in plan whether circular, other closed curve, polygonal, or a combination thereof. Further, terms such as "vertical" and "horizontal" are terms of relative direction rather than terms of absolute orientation in space.

The outer ends of yoke 12 also support hydraulic mold box cylinders 23 which are double-acting and operated by means of hydraulic fluid which passes through the respective ports 24. A piston 25 in each cylinder 23 is acted upon by such hydraulic fluid to move a piston rod 26 to depress a mold box table 27 and its mold box 28 at an appropriate time in a cycle of operations and to the appropriate extent. Stop collars 29 are employed on upward extensions 30 above the cylinders 23 to limit the downward movement of the rods 26, the collars 29 being adjustable for setting at the appropriate distance selected for a particular operation, or set of operations. The lower ends of the extensions 30 are fixed to and move with the pistons 25.

Table 27 is vertically slidable on the rods 11 and at all times urged by springs 32 toward the underside of the stop collars 31 in the at rest position plane 50. Collars 31 are fixed in adjusted position on the standards 11 as selected by the operation of the device. Fixed stops 33 on rods 11 support the bottoms of the normally compressed springs 32 of selected strength. Mold box 28 has a periphery in plan which is substantially identical to the periphery of lower end 20 of head 18. The lower end of the mold box 28 is closed by a plunger 34 having a top 35 which is the actual closure surface. The generally horizontal bounds of the mold comprise surfaces 21 and 35 and the vertical bounds are the wall or walls 36 of mold box 28. Those walls 36 flare upwardly to a slight extent, which feature per se is neither novel nor claimed herein.

As shown, mold box 28 is adapted to make a hollow molded shape of solids 22 in annular form owing to the use in machine 10 of a vertical mandrel core 37 which preferably is slightly tapered in an upward direction as more clearly appears in FIGURES 2 and 3. In the illustrated embodiment, core 37 extends vertically upwardly and through the center of mold box 28, the top of the mandrel core 37 in at least the at rest position of machine 10 preferably being in plane 50 with the top of table 27 for convenience in the filling of mold box 28 at the start of a molding operation, with solids 22 to be adherently molded therein.

Mandrel 37 extends downwardly through a slidable opening therefor in the top of plunger 34 and continues on through yoke 13, the lower end 38 of mandrel 37 being threaded to be engaged by a nut 39 which fixes the maximum uppermost position of the top of mandrel 37 inasmuch as it passes freely through yoke 13. An adjustable height fitting 40 is used to support the bottom of a coil spring 41 under compression around mandrel 37 between fitting 40 and a collar 42 fixed to mandrel 37 at a selected height within hollow plunger 34.

Plunger 34 is fixed to a platen 43 which is slidable upon the rods 11 and normally rests a predetermined distance above yoke 13 determined by the setting of adjustable stops 44. Platen 43 has lateral brackets 45 connected to which hydraulic rams 46 are affixed, such rams extending into single-acting hydraulic cylinders 47 supplied with hydraulic fluid at the appropriate time and pressure and to the appropriate extent through ports 48. When cylinders 47 are actuated at the completion of a molding operation, plunger 34 will rise and eject the newly final molded shape of solids 22, the upward extent of movement of plunger 34 being limited by upper stops 49, which preferably bring top 35 at the completion of an operation, during the ejection of a molded shape, flush with plane 50.

In one operation of the illustrated embodiment of this invention, for example, when machine 10 is at rest, piston 15 and head 18 are all the way up, the top of table 27 is in plane 50 against the underside of stops 31 due to the pressure of springs 32, mold box 28 is empty, the top of core 37 is in plane 50, and plunger 34 is down in the position shown in the figures. Mold box 28 then is filled with solids 22, usually relatively dry granular moldable refractory or ceramic solids in particle form, to the level of the top of table 27 in plane 50. Thereupon, hydraulic fluid at selected pressure is admitted to the upper port 16 of cylinder 14 forcing head 18 down until surface 21 contacts the upper annular surface of solids 22 and the top of core 37 enters the lower end of opening 19. Such downward movement of head 18 continues until at the selected pressure, head 18 is stopped by the resistance of compacted solids 22, having molded them into the almost final shape designated 22a in FIGURE 2 and shown in both FIGURES 1 and 2. In the course of producing such molded shape 22a, head 18 has been moved downwardly below level 50 a distance, which is not to scale and for the sake of illustration only, indicated in FIGURE 2 (and FIGURE 1). At the same time, because of forces generated in the course of molding shape 22a such as sidewall friction, table 27 and mold box 28 have been moved downwardly through a distance 51, core 37 has been moved downwardly through a distance 52 and plunger 34 has not moved at all. The molded shape 22a, which heretofore would have been considered a finished molded shape, has however even with a slight upward flare in wall or walls 36 and a slight upward taper of core 37 within the mold box space, zones of lesser density usually tending to extend inwardly from wall 36, intermediate the top and bottom of that molded shape 22a.

Continuing the recital of an illustrative cycle of operations, hydraulic fluid at selected pressure then is admitted to the upper ports 24 of the mold box cylinders 23 so that the lower ends of the rods 26 will move down and engage (FIGURE 1 depicts the beginning of such engagement) lateral extensions 53 of table 27 and depress it against the further resistance of springs 32, pushing table 27 and mold box 28 down a further small distance 54. Such momentarily relaxes the outer surface of molded shape 22a as mold box 28 is pushed down without movement of plunger 34 because of the slight upward flare in wall or walls 36. At the same time, the hydraulic pressure of the fluid admitted through upper port 16 having remained operative on the upper side of piston 15, head 18 descends a further distance 55 moving core 37 down a slight additional distance represented illustratively only by the difference between distance 56 and distance 52, while at the same time producing a final molded shape marked 22b in FIGURE 3 comprising the solids 22 in a now uniformly dense molded shape condition of marked superiority. Further, in the course of producing final and uniform molded shape 22b, vertical surface friction and wear are inhibited to provide better and more trouble-free operation.

Immediately following the completion of the molding of final shape 22b as described above, hydraulic fluid is admitted through the lower ports 24, raising the pistons 25 and bottoms of rods 26 at least as high as plane 50. Then, hydraulic fluid at selected pressure is directed to the underside of piston 15 raising head 18 away from table 27, whereupon the position in space of mold box 28 returns to the control and influence of springs 32 which at least initiate upward movement of the top of table 27 toward plane 50 and movement of the central opening 22c in final molded shape 22b from the surface of slightly upwardly tapered core 37. It will be recognized that any suitable hydraulic circuit may be used for the operation of machine 10 and may be manual, automatic, or semi-automatic, as a matter within the ordinary skill of those having to do with such circuits. Upon the return of head 18 to its uppermost position, hydraulic fluid is admitted to the cylinders 47 moving plunger 34 upwardly until it is flush with the top of table 27 and the top of core 37 in plane 50 so that final molded shape 22b may readily be slid off of table 27 or to one side thereon, freeing the embodiment of machine 10 for a new cycle of operations under this invention.

Various changes may be made in the described structure and operation of the illustrated embodiment, and other embodiments provided, without departing from the spirit of this invention, or the scope of the appended claims.

I claim:

1. A press for molding solids, comprising, in combination, a vertically movable upwardly biased mold box, means for yieldingly biasing said mold box, said mold box having an inner vertical wall, said wall having a slight upward flare, an upwardly and independently movable plunger comprising the bottom of said mold box, an upwardly biased depressible mandrel core extending vertically and centrally within said mold box, said core having a slight upward taper, a pressing head having a lower annular pressing surface in opposition to the plunger adapted to compact solids in the mold space extending upwardly from the top of said plunger toward said head, the pressing surface being movable a slight distance into the space defined between said core and wall, depressing means acting on said pressing head, said mold box and core being initially and simultaneously depressed against said upward bias in the course of the initial molding operation, means for further depressing said mold box after initial depression an additional amount, said head moving during depression of the mold box to further press said solids for uniform densification thereof into a final molded shape, means for withdrawing said head upon completion of said further press, and means to elevate said plunger to raise said final molded shape substantially out of said mold box and off said core.

2. A press for molding solids, comprising, in combination, a vertically movable mold box having a peripheral closed slightly flared vertical wall, a movable bottom for said mold box, means holding said bottom in fixed spatial position during molding operation irrespective of any movement of said wall, a pressing head having a pressing surface in opposition to said bottom adapted to compact solids in a mold space extending generally upwardly from the top of said bottom, said head being movable slightly into the space defined within said wall, means for moving said head, said mold box being depressible by the action of said head on the contents of the box in the first course of a molding operation, and means acting on said mold box directly to depress said box a slight additional amount while said head moving means acts simultaneously to depress said head to cause said head to further press said solids for uniform densification thereof into a final molded shape.

3. A press for molding solids as set forth in claim 2, wherein said bottom fixing means comprises means for moving said bottom upwardly relative to said wall to push said final molded shape substantially out of said mold box.

4. A press for molding solids as set forth in claim 2, comprising, further, a mandrel core extending upwardly into said mold box through said bottom and movable relative thereto, said core having a slight upward taper, said head being recessed to present a lower annular pressing surface capable of surrounding said core in part when said pressing head is extended into said mold box.

5. A press for molding solids comprising, in combination, a vertically movable mold box, means yieldingly biasing said mold box in an upward direction, said mold box having an inner vertical wall, said wall having a slight upward flare, an upwardly and independently movable plunger forming the bottom of said mold box, a depressible mandrel core extending vertically and centrally within said mold box, said core having a slight upward taper, a pressing head, means acting on said head to move same toward and away from said mold box, said pressing head having a lower annular pressing surface movable into the mold box a sufficient amount to compact solids into an intermediate molded shape in the mold space defined upwardly from the top of said plunger and laterally between said core and wall, said mold box and core being respectively depressible simultaneously in the course of a molding operation, mold box cylinders acting thereon for further depressing said mold box a slight additional amount whereby said head depresses a slight additional amount to further press said solids to relatively uniformly densify them into a final molded shape, said head moving means withdrawing said head upon completion of said further press, and means to elevate said plunger to raise said final molded shape substantially out of said mold box and off said core.

6. A press for molding solids comprising, in combination, a vertically movable upwardly biased mold box means yieldingly biasing said mold box in an upward direction, said mold box having an inner vertical wall, said wall having a slight upward flare, a relatively movable bottom in said mold box, a pressing head having a lower pressing surface movable into the moldbox a sufficient distance to compact solids into an intermediate molded shape in the mold space within the volume of said mold box and said movable bottom, means for actuating said head, said box moving against said bias during movement of said head, mold box cylinders for depressing said mold box a slight amount after said head has stopped its movement to permit said head to additionally compress said solids to relatively uniformly densify them into a final molded shape, said head actuating means acting to withdraw said head upon completion of said final molded shape, and means to push said final molded shape substantially out of said mold box by movement of said bottom relative to said wall.

References Cited by the Examiner

UNITED STATES PATENTS

| | | | |
|---|---|---|---|
| 2,209,404 | 7/40 | Lassman | 25—91 XR |
| 2,348,197 | 5/44 | Ernst et al. | 25—91 XR |
| 2,449,257 | 9/48 | Tucker | 18—16.5 |
| 2,562,876 | 8/51 | Baeza | 18—16.5 |
| 2,598,016 | 5/52 | Richardson | 18—16.5 XR |
| 2,724,145 | 11/55 | Hall | 18—16.5 |
| 2,858,565 | 11/58 | Lowey | 18—16.5 XR |
| 3,041,701 | 7/62 | Gates | 18—16.5 XR |
| 3,061,877 | 11/62 | Custers et al. | 18—16.5 |
| 3,067,465 | 12/62 | Giardini et al. | 18—16.5 |
| 3,081,498 | 3/63 | Davis et al | 18—59.3 |
| 3,084,397 | 4/63 | Diemer et al. | 18—59.3 |
| 3,132,379 | 5/64 | Crane | 18—16.5 |

WILLIAM J. STEPHENSON, *Primary Examiner.*

MORRIS LIEBMAN, MICHAEL V. BRINDISI,
*Examiners.*